US011779835B1

(12) United States Patent
Wang

(10) Patent No.: US 11,779,835 B1
(45) Date of Patent: Oct. 10, 2023

(54) VIDEO GAME CONTROLLER

(71) Applicant: HUBEI ZUANMA INTELLIGENT CONTROL TECHNOLOGY CO., LTD, E'zhou (CN)

(72) Inventor: Sen Wang, Shenzhen (CN)

(73) Assignee: HUBEI ZUANMA INTELLIGENT CONTROL TECHNOLOGY CO., LTD, E'zhou (CN)

( * ) Notice: Subject to any disclaimer, the term of this patent is extended or adjusted under 35 U.S.C. 154(b) by 0 days.

(21) Appl. No.: 17/964,864

(22) Filed: Oct. 12, 2022

(30) Foreign Application Priority Data

Sep. 16, 2022 (CN) .......................... 202222467265.5

(51) Int. Cl.
    *A63F 13/24* (2014.01)
(52) U.S. Cl.
    CPC .................................... *A63F 13/24* (2014.09)
(58) Field of Classification Search
    CPC ....................................................... A63F 13/24
    See application file for complete search history.

(56) References Cited

U.S. PATENT DOCUMENTS

| | | | | |
|---|---|---|---|---|
| 7,407,439 | B1* | 8/2008 | Ochoa | A63F 13/24 345/161 |
| 7,837,559 | B2* | 11/2010 | Kidakarn | A63F 13/24 463/37 |
| 2006/0079328 | A1* | 4/2006 | Wang | A63F 13/28 463/37 |
| 2017/0361222 | A1* | 12/2017 | Tsuchiya | A63F 13/285 |

* cited by examiner

*Primary Examiner* — David L Lewis
*Assistant Examiner* — Shauna-Kay Hall

(57) ABSTRACT

A video game controller includes a first controller outer housing and a second controller outer housing. The first controller outer housing and the second controller outer housing are detachably connected. A first controller inner housing, a second controller inner housing, a battery, and a wireless charging board are disposed in the first controller outer housing and the second controller outer housing. A control board is disposed in the second controller outer housing, and the control board is electrically connected to the wireless charging board. A lighting assembly is disposed on the control board, and the lighting assembly is configured to emit light for the video game controller. The first controller outer housing and the second controller outer housing are made of a transparent material, and the first controller inner housing and the second controller inner housing are in semi-transparent structures.

8 Claims, 4 Drawing Sheets

VIDEO GAME CONTROLLER

TECHNICAL FIELD

The present disclosure relates to a technical field of video game controllers, and in particular to a video game controller.

BACKGROUND

Video game controllers are a common accessory for video games, which manipulates buttons and the like for controlling game virtual characters. However, most of conventional video game controllers only have simple control buttons, which are relatively single in function and poor in fun, so that experience feeling of users cannot be satisfied.

Therefore, there is an urgent technical problem that how to provide a video game controller to increase functionality of the video game controllers and improve the experience feeling of the users to be solved.

SUMMARY

The present disclosure aims at solving a technical problem of how to provide a video game controller to increase functionality of the video game controller and improve experience feeling of users.

The present disclosure provides a video game controller, including a first controller outer housing and a second controller outer housing. The first controller outer housing and the second controller outer housing are detachably connected. A first controller inner housing, a second controller inner housing, a battery, and a wireless charging board are disposed in the first controller outer housing and the second controller outer housing. The wireless charging board is configured to wirelessly charge the battery. A control board is disposed in the second controller outer housing, and the control board is electrically connected to the wireless charging board. A lighting assembly is disposed on the control board, and the lighting assembly is configured to emit light for the video game controller. The first controller outer housing and the second controller outer housing are made of a transparent material, and the first controller inner housing and the second controller inner housing are in semi-transparent structures.

Furthermore, the lighting assembly includes first lighting lamps and second lighting lamps, and the first lighting lamps and the second lighting lamps are respectively and electrically connected to the control board.

Furthermore, the lighting assembly includes eight first lighting lamps, four of the eight first lighting lamps are distributed at a first end of the control board, and another four of the eight first light lamps are distributed at a second end of the control board.

Furthermore, the lighting assembly includes two second lighting lamps, and the two second lighting lamps are respectively distributed at two opposite ends of the control board.

Furthermore, first positioning columns are disposed in the first controller outer housing, first positioning grooves are defined on the first controller inner housing, where the first positioning grooves are matched with the first positioning columns for inserting. Second positioning blocks are disposed in the second controller outer housing, second positioning grooves are defined on the second controller inner housing, where the second positioning grooves are matched with the second positioning blocks for positioning.

Furthermore, the first positioning grooves are defined on a side wall of the first controller inner housing, and the first positioning grooves are matched with the second positioning blocks for positioning.

Furthermore, second positioning columns are disposed in the second controller outer housing, and the second positioning columns are matched with the first positioning columns for inserting. Positioning lug bosses are disposed in the second positioning columns, and the positioning lug bosses abut against the first positioning columns.

Furthermore, first positioning holes, having inner screw threads, are defined in the first positioning columns. Second positioning holes are defined in the second positioning columns, and the second positioning holes are matched with the first positioning holes. The first controller outer housing and the second controller outer housing are connected through screws.

Furthermore, several control buttons are connected to the control board, and the several control buttons are configured to control game programs.

Furthermore, concave grooves are defined on the second controller outer housing.

Beneficial effects of the video game controller are as follows.

The wireless charging board of the present disclosure is configured to wirelessly charge, which is convenient for wirelessly charging the video game controller. The lighting assembly of the present disclosure is configured to emit light, which is convenient for lighting display of the video game controller. Thereby, the present disclosure provides the video game controller having a wireless charging function and a light-emitting function, which increases the functionality of the video game controller and further improves the experience feeling of the users.

BRIEF DESCRIPTION OF DRAWINGS

In order to more clearly illustrate the specific embodiments of the present disclosure or technical solutions in the prior art, the following briefly introduces the accompanying drawings required for describing the specific embodiments or the prior art. Apparently, the accompanying drawings in the following description show some embodiments of the present disclosure, and a person of ordinary skill in the art may still derive other drawings from these accompanying drawings without creative efforts.

Figure 1:
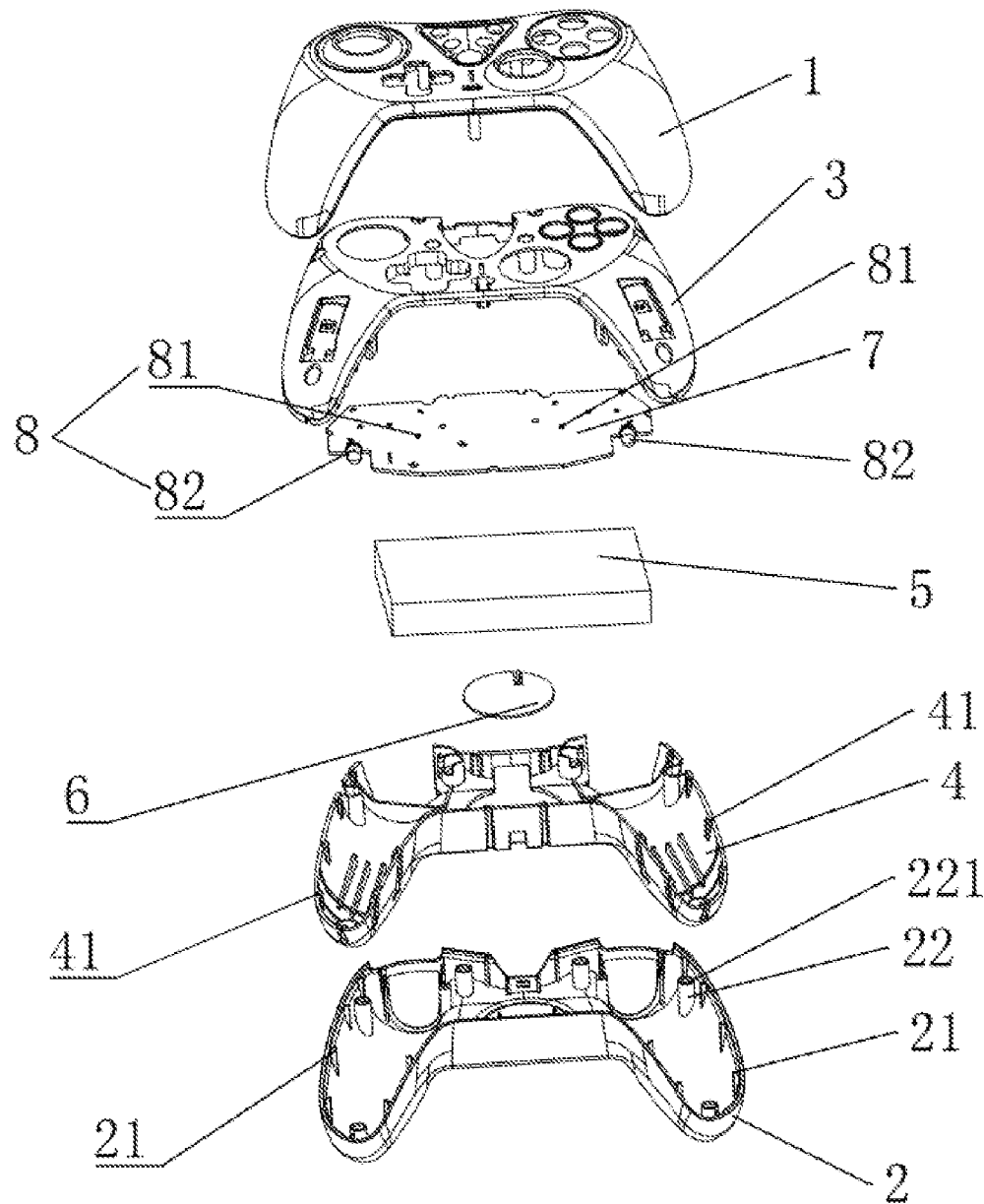
FIG. 1 is a first schematic diagram of a partial exploded structure of a video game controller according to one embodiment of the present disclosure.

Reference number in the drawings: 1. first controller outer housing; 11. first positioning column; 111. first positioning hole; 2. second controller outer housing; 21. second positioning block; 22. second positioning column; 221. positioning lug boss; 222. second positioning hole; 23. concave groove; 3. first controller inner housing; 31. first positioning groove; 4. second controller inner housing; 41. second positioning groove; 5. battery; 6. wireless charging board; 7.

control board; 8. lighting assembly; 81. first lighting lamp; 82. second lighting lamp; and 9. control button.

DETAILED DESCRIPTION

In order to make the objectives, technical solutions, and advantages of the present disclosure clearer, the following further describes the present disclosure in detail with reference to the accompanying drawings and embodiments. It should be understood that the specific embodiments described herein are merely used to explain the present disclosure and are not intended to limit the present disclosure.

In the description of the present disclosure, it should be noted that, unless specified or limited otherwise, the terms "disposed", "connected with", and "connected to" should be understood in a broad sense, for example, may be a fixed connection, a detachable connection, or an integral connection; may be a mechanical connection, or may be an electrical connection, may be a direct connection, may also be indirectly connected by means of an intermediate medium, or may be a communication between two elements, may be a wireless connection, or may be a wired connection. For a person of ordinary skill in the art, the specific meanings of the above terms in the present disclosure may be understood in detail.

In the description of the present disclosure, it should be noted that the orientations or positional relationships indicated by the terms "center", "upper", "lower", "left", "right", "vertical", "horizontal", "inner", "outer", etc. are based on the orientation or positional relationship shown in the drawings, and are merely intended to facilitate describing the present disclosure and simplifying the description, rather than indicating or implying that the indicated apparatus or element must have a specific orientation, be constructed and operated in a specific orientation, and therefore cannot be understood as a limitation to the present disclosure. In addition, the terms "first", "second", and "third" are used for descriptive purposes only and are not to be construed as indicating or implying relative importance.

In addition, the technical features involved in the different embodiments of the present disclosure described below can be combined with each other as long as they do not conflict with each other.

The present disclosure provides a video game controller, as shown in FIGS. 1-4, including a first controller outer housing 1 and a second controller outer housing 2. The first controller outer housing 1 and the second controller outer housing 2 are detachably connected. A first controller inner housing 3, a second controller inner housing 4, a battery 5, and a wireless charging board 6 are disposed in the first controller outer housing 1 and the second controller outer housing 2. The wireless charging board 6 is configured to wirelessly charge the battery 5. A control board 7 is disposed in the second controller outer housing 4, and the control board 7 is electrically connected to the wireless charging board 6. A lighting assembly 8 is disposed on the control board 7, and the lighting assembly 8 is configured to emit light for the video game controller. The first controller outer housing 1 and the second controller outer housing 2 are made of a transparent material, and the first controller inner housing 3 and the second controller inner housing 4 are in semi-transparent structures.

It should be noted that the wireless charging board 6 is configured to wirelessly charge, which is convenient for wirelessly charging the video game controller. The lighting assembly 8 is configured to emit light, which is convenient for lighting display of the video game controller. Thereby, the present disclosure provides the video game controller having a wireless charging function and a light-emitting function, which increases functionality of the video game controller and further improves experience feeling of users.

Figure 2:
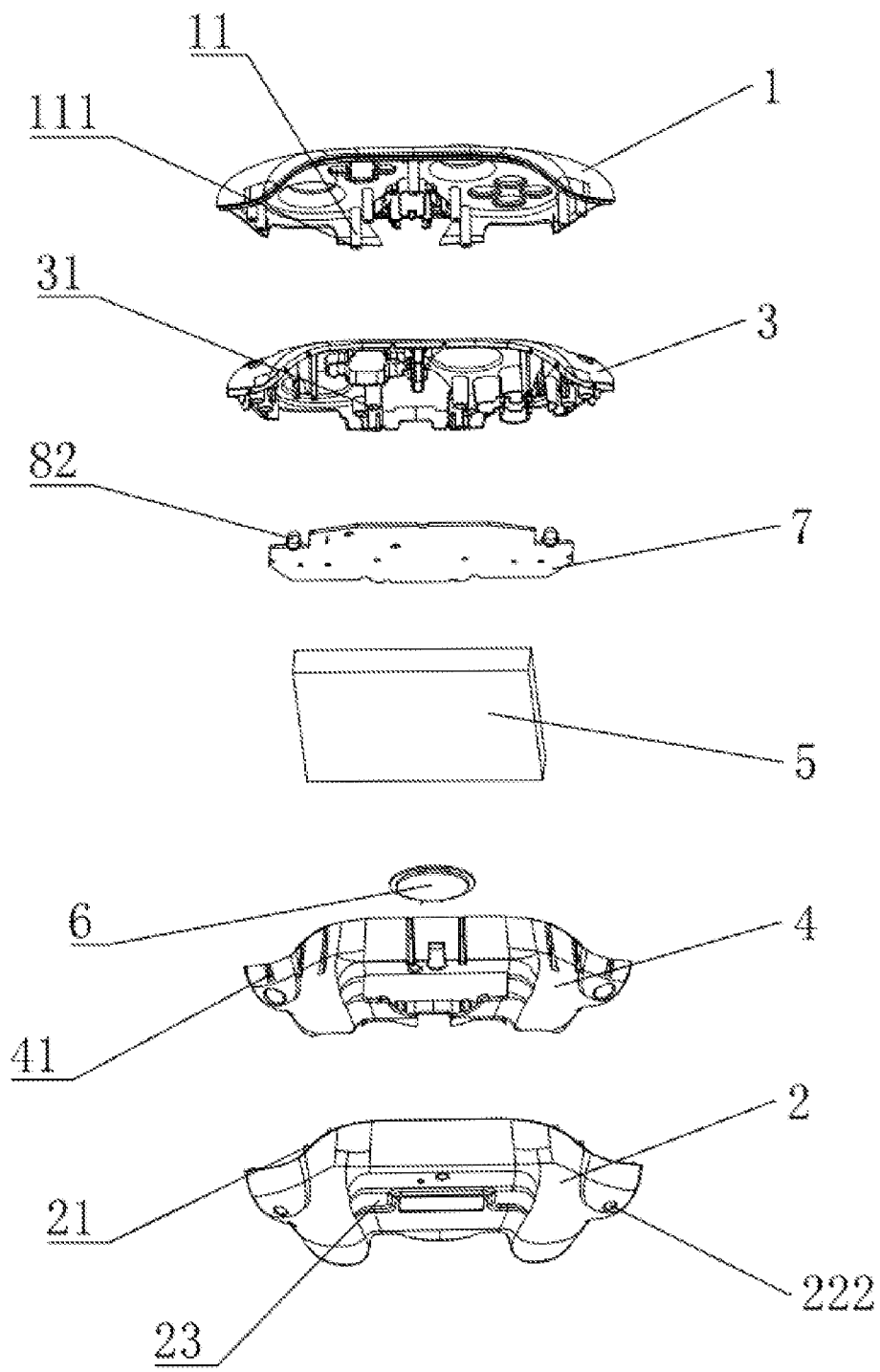
FIG. 2 is a second schematic diagram of the partial exploded structure of the video game controller according to one embodiment of the present disclosure.
Figure 3:
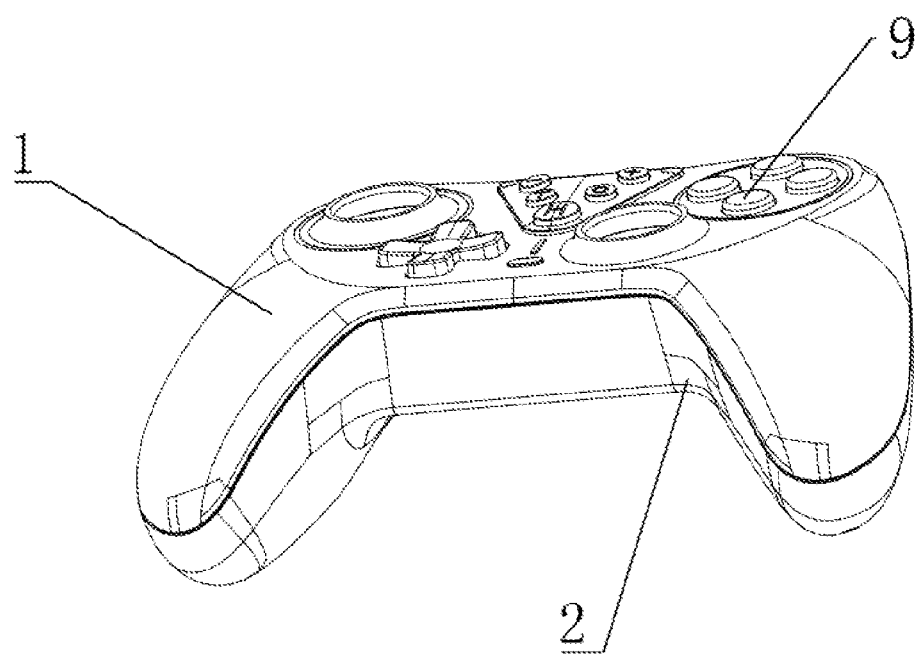
FIG. 3 is a structural schematic diagram of the video game controller according to one embodiment of the present disclosure.
Figure 4:
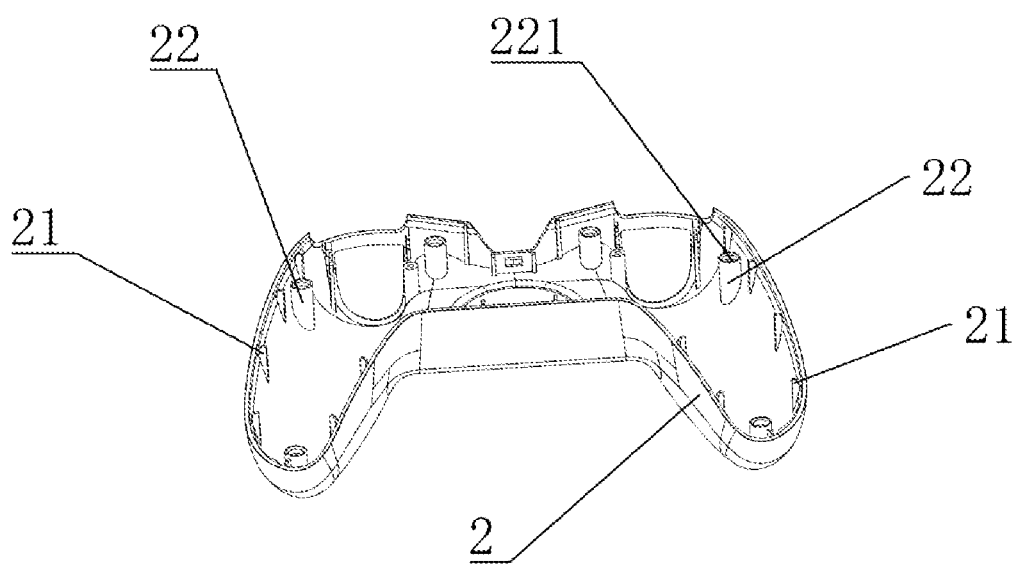
FIG. 4 is a structural schematic diagram of a second controller inner housing of the video game controller according to one embodiment of the present disclosure.

As shown in FIGS. 1-2, the lighting assembly 8 includes first lighting lamps 81 and second lighting lamps 82, and the first lighting lamps 81 and the second lighting lamps 82 are respectively and electrically connected to the control board 7.

As shown in FIGS. 1-2, a lighting assembly 8 of a video game controller of the present disclosure includes eight first lighting lamps 81, four of the eight first lighting lamps 81 are distributed at a first end of the control board 7, and another four of the eight first light lamps 81 are distributed at a second end of the control board 7. In the embodiment, the eight first lighting lamps 81 are SMD LEDs.

As shown in FIGS. 1-2, a lighting assembly 8 of a video game controller of the present disclosure includes two second lighting lamps 82, and the two second lighting lamps 82 are respectively distributed at two opposite ends of the control board 7. In the embodiment, the two second lighting lamps 82 are LED bulbs.

As shown in FIGS. 1-2, first positioning columns 11 are disposed in the first controller outer housing 1, first positioning grooves 31 are defined on the first controller inner housing 3, where the first positioning grooves 31 are matched with the first positioning columns 11 for inserting. Second positioning blocks 21 are disposed in the second controller outer housing 2, second positioning grooves 41 are defined on the second controller inner housing 4, where the second positioning grooves 41 are matched with the second positioning blocks 21 for positioning.

It should be noted that the video game controller of the present disclosure provides multiple first positioning columns 11, multiple first positioning grooves 31, multiple second positioning blocks 21, and multiple second positioning grooves 41. The first positioning columns 11 are matched with the first positioning grooves 31 for inserting, so that the first controller inner housing 3 is tightly disposed in the first controller outer housing 1. The second positioning blocks 21 are matched with the second positioning groove 41 for positioning, so that the second controller inner housing 4 is tightly disposed in the second controller outer housing 2. Thereby, the inner housings and the outer housings of the video game controller of the present disclosure are tightly assembled.

As shown in FIGS. 1-2, second positioning columns 22 are disposed in the second controller outer housing 2, and the second positioning columns 22 are matched with the first positioning columns 11 for inserting. Positioning lug bosses 221 are disposed in the second positioning columns 22, and the positioning lug bosses 221 abut against the first positioning columns 11. It should be noted that the first positioning columns 11 are matched with the second positioning columns 22 for inserting, which is convenient for assemble the video game controller, and the positioning lug bosses 221 are configured to limit, when the first positioning columns 11 abut against the positioning pug bosses 221, the first positioning columns 11 are inserted in place.

As shown in FIGS. 1-2, first positioning holes 111, having inner screw threads, are defined in the first positioning columns 11. Second positioning holes 222 are defined in the second positioning columns 22, and the second positioning holes 222 are matched with the first positioning holes 111. The first controller outer housing 1 and the second controller outer housing 2 are connected through screws. It should be noted that the video game controller of the present disclosure provides the multiple first positioning columns 11 and the multiple second positioning columns 22. The screws penetrate through the second positioning holes 222 to be in threaded connection with the first positioning holes 111, which is convenient for disassembling the video game controller.

As shown in FIGS. 1-2, several control buttons 9 are connected to the control board 7, and the several control buttons 9 are configured to control game programs. In the embodiment, the control buttons 9 include a direction button, a function button, a selection button, and a menu button.

As shown in FIGS. 1-2, concave grooves 23 are defined on the second controller outer housing 2. It should be noted that the concave grooves 23 are configured to place fingers of the users inside, which is convenient for holding and further improves experience feeling of users.

Working principle of the present disclosure is as follows.

The wireless charging board 6 of the present disclosure is configured to wirelessly charge, which is convenient for wirelessly charging the video game controller. The lighting assembly 8 of the present disclosure is configured to emit light, which is convenient for lighting display of the video game controller. Thereby, the present disclosure provides the video game controller having a wireless charging function and a light-emitting function, which increases functionality of the video game controller and further improves the experience feeling of the users.

Apparently, the above embodiments are merely examples for clearly illustrating the embodiments, and are not intended to limit the embodiments. For the person of ordinary skill in the art, other different forms of changes or variations can be made on the basis of the above description. It is not necessary for all implementations to be exhaustive here. The obvious changes or variations derived therefrom are still within the scope of protection of the present disclosure.

What is claimed is:

1. A video game controller, comprising:
a first controller outer housing; and
a second controller outer housing;
wherein the first controller outer housing and the second controller outer housing are detachably connected; a first controller inner housing, a second controller inner housing, a battery, and a wireless charging board are disposed in the first controller outer housing and the second controller outer housing; the wireless charging board is configured to wirelessly charge the battery; a control board is disposed in the second controller outer housing, and the control board is electrically connected to the wireless charging board; a lighting assembly is disposed on the control board, and the lighting assembly is configured to emit light for the video game controller;
the first controller outer housing and the second controller outer housing are made of a transparent material, and the first controller inner housing and the second controller inner housing are in semi-transparent structures;
wherein first positioning columns are disposed in the first controller outer housing, first positioning grooves are defined on the first controller inner housing, where the first positioning grooves are matched with the first positioning columns for inserting; second positioning blocks are disposed in a bottom edge of the second controller outer housing, second positioning grooves are defined on a bottom edge of the second controller inner housing, where the second positioning grooves are matched with the second positioning blocks for positioning;
wherein concave grooves are defined on the second controller outer housing to place fingers of the users inside for conveniently holding the second controller outer housing.

2. The video game controller according to claim 1, wherein the lighting assembly comprises first lighting lamps and second lighting lamps, and the first lighting lamps and the second lighting lamps are respectively and electrically connected to the control board.

3. The video game controller according to claim 2, wherein the lighting assembly comprises eight first lighting lamps, four of the eight first lighting lamps are distributed at a first end of the control board, and another four of the eight first light lamps are distributed at a second end of the control board.

4. The video game controller according to claim 2, wherein the lighting assembly comprises two second lighting lamps, and the two second lighting lamps are respectively distributed at two opposite ends of the control board.

5. The video game controller according to claim 1, wherein the first positioning grooves are defined on a side wall of the first controller inner housing, and the first positioning grooves are matched with the second positioning blocks for positioning.

6. The video game controller according to claim 1, wherein second positioning columns are disposed in the second controller outer housing, and the second positioning columns are matched with the first positioning columns for inserting; positioning lug bosses are disposed in the second positioning columns, and the positioning lug bosses abut against the first positioning columns.

7. The video game controller according to claim 6, wherein first positioning holes, having inner screw threads, are defined in the first positioning columns; second positioning holes are defined in the second positioning columns, and the second positioning holes are matched with the first positioning holes; the first controller outer housing and the second controller outer housing are connected through screws.

8. The video game controller according to claim 1, wherein several control buttons are connected to the control board, and the several control buttons are configured to control game programs.

* * * * *